United States Patent
Hammer et al.

(10) Patent No.: US 9,924,333 B2
(45) Date of Patent: Mar. 20, 2018

(54) PUSH-TO-TALK SERVICE FEATURES

(71) Applicant: Verizon Patent and Licensing Inc., Arlington, VA (US)

(72) Inventors: Howard G. Hammer, Wayne, NJ (US); Adam J. Simon, Keller, TX (US); Nishanth Vontela, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/838,748

(22) Filed: Aug. 28, 2015

(65) Prior Publication Data

US 2016/0330595 A1    Nov. 10, 2016

Related U.S. Application Data

(60) Provisional application No. 62/157,135, filed on May 5, 2015.

(51) Int. Cl.
*H04W 4/10* (2009.01)

(52) U.S. Cl.
CPC .................................... *H04W 4/10* (2013.01)

(58) Field of Classification Search
CPC ....... H04W 4/08; H04W 4/10; H04W 76/005; H04W 84/08; H04M 1/72519
USPC ................................................. 455/518–521
See application file for complete search history.

(56) References Cited

U.S. PATENT DOCUMENTS

| | | | | |
|---|---|---|---|---|
| 6,546,101 B1* | 4/2003 | Murray | ............... | H04M 1/22 379/433.02 |
| 2004/0142694 A1* | 7/2004 | Levy | ............... | H04W 76/005 455/450 |
| 2004/0266468 A1* | 12/2004 | Brown | ............... | H04M 1/72519 455/518 |
| 2005/0143135 A1* | 6/2005 | Brems | ............... | H04M 1/2745 455/564 |
| 2008/0077863 A1* | 3/2008 | Jong | ............... | G06F 3/048 715/277 |
| 2009/0005011 A1* | 1/2009 | Christie | ............... | G06Q 10/107 455/412.2 |
| 2009/0042599 A1* | 2/2009 | Scott | ............... | G06F 3/0236 455/550.1 |
| 2009/0303878 A1* | 12/2009 | Savarkar | ............... | H04W 4/10 370/235 |
| 2011/0254856 A1* | 10/2011 | Yoo | ............... | G06F 3/04817 345/619 |
| 2013/0130642 A1* | 5/2013 | Joul | ............... | H04L 41/5064 455/406 |
| 2015/0215413 A1* | 7/2015 | Lindner | ............... | H04L 67/24 709/224 |
| 2015/0358550 A1* | 12/2015 | Faber | ............... | H04N 5/23293 348/333.02 |

(Continued)

*Primary Examiner* — Raymond Dean

(57) ABSTRACT

A device provides a user interface that includes a list of push-to-talk contacts, and receives, via the user interface, a gesture indicating a request to establish a push-to-talk call with a particular contact in the list of push-to-talk contacts. The device initiates the push-to-talk call with another device associated with the particular contact, and the push-to-talk call is initiated with the other device based on the gesture and directly from within the user interface. The device provides for display a visual indicator associated with the push-to-talk call.

20 Claims, 12 Drawing Sheets

(56) References Cited

U.S. PATENT DOCUMENTS

2015/0358834 A1* 12/2015 Cronin .................. H04W 24/02
                                                                              455/452.1

* cited by examiner

PUSH-TO-TALK SERVICE FEATURES

RELATED APPLICATION

This application claims priority under 35 U.S.C. § 119 based on U.S. Provisional Patent Application No. 62/157,135, filed May 15, 2015, the disclosure of which is incorporated by reference herein in its entirety.

BACKGROUND

A push-to-talk (PTT) service provides direct one-to-one and/or one-to-many audio communication. PTT may include a mechanism that provides instantaneous communication between parties, and that utilizes a button to switch user equipment (UE) from a voice transmission mode to a voice reception mode. The operation of UEs in this manner may be similar to how walkie talkies operate. A PTT service may switch a UE from a full duplex mode, where both parties may hear each other simultaneously, to a half duplex mode, where a single party may speak at one time. Multiple parties or a group conversation may also be provided by a PTT service. Availabilities of parties may be checked before a call with the help of a presence function.

DETAILED DESCRIPTION OF PREFERRED EMBODIMENTS

The following detailed description refers to the accompanying drawings. The same reference numbers in different drawings may identify the same or similar elements.

Typical PTT applications provide a UE with a PTT contact list view that includes a list of PTT contacts associated with a user of the UE. However, the typical PTT applications require the user to access one or more levels of the PTT contact list view (e.g., associated with a particular PTT contact) in order to begin communicating with the particular PTT contact. For example, a typical PTT application may require the user to select the particular PTT contact from the PTT contact list view, and to access details associated with the particular PTT contact. The typical PTT application may then require the user to select a mechanism, from the details, in order to begin a PTT communication with the particular PTT contact.

Systems and/or methods, described herein, may provide a PTT service that enables a UE to quickly and easily communicate with a PTT contact or a group of PTT contacts directly from a PTT contact list view, a PTT group list view, a recent activity view, or the like. The PTT service may enable the UE to establish a PTT call with or send a message to a selected PTT contact or PTT group directly from within the PTT contact list view, the PTT group list view, the recent activity view, or the like. The PTT service may also enable the UE to provide visual indicators that provide indications of connectivity and/or voice volume associated with PTT contacts.

Figure 1:
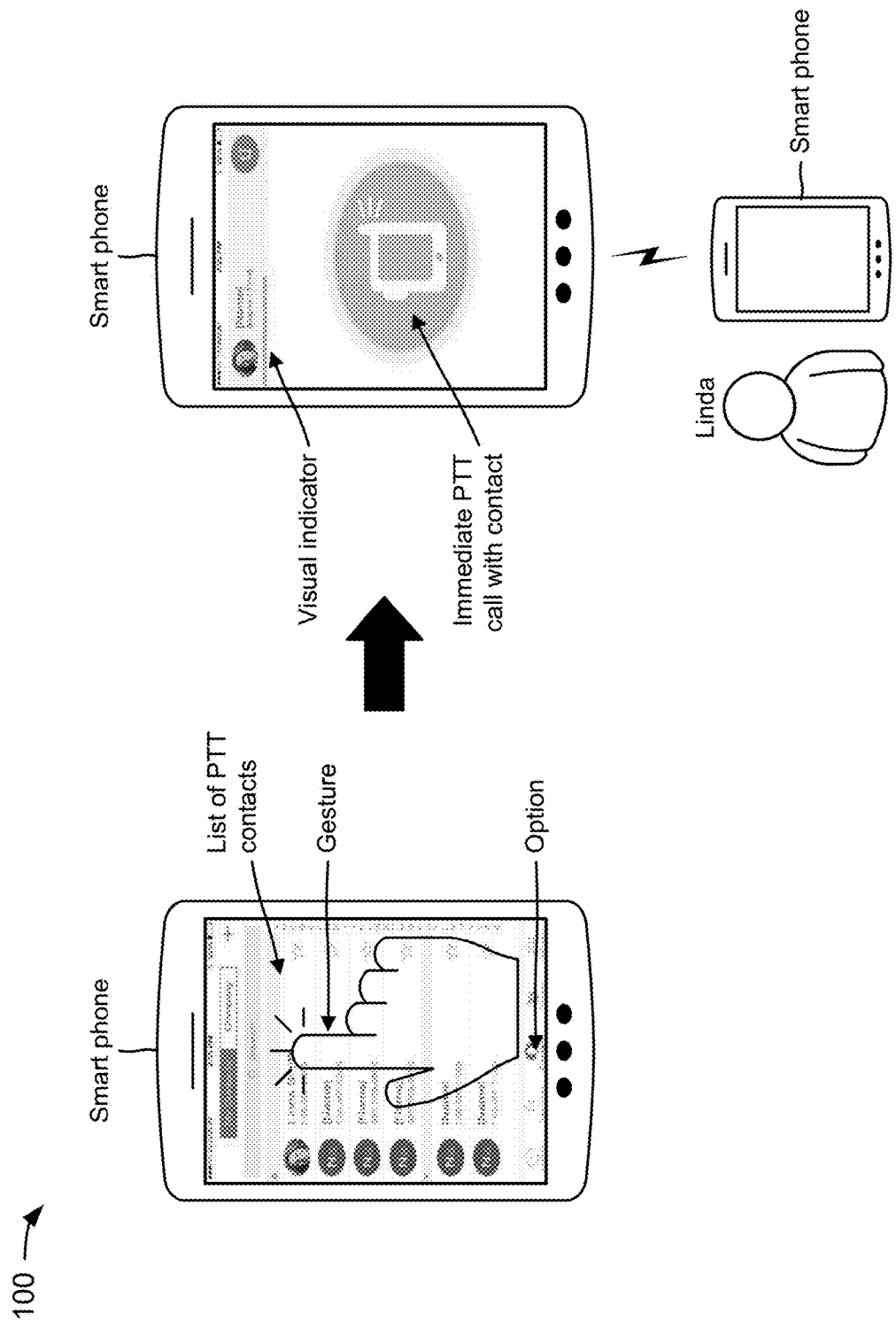
FIG. 1 is a diagram of an overview of an example implementation described herein.

FIG. 1 is an overview of an example implementation 100 described herein. As shown in FIG. 1, assume that a UE (e.g., a smart phone) includes a PTT service or application that enables the smart phone to establish a PTT call with or send a message to a PTT contact or PTT group of contacts. As shown to the left in FIG. 1, assume that the PTT service causes the smart phone to display a user interface that includes options, such as an option to display a list of PTT contacts. Further, assume that a user of the smart phone selects the option to display the list of PTT contacts. Based on the selection of the option, the smart phone may display, in the user interface, a list of PTT contacts associated with the user.

As further shown to the left in FIG. 1, the user may utilize a gesture with the user interface to select one of the PTT contacts provided in the PTT contact list. For example, the user may select information associated with a PTT contact named Linda via the gesture. When the user selects the information associated with Linda via a specific gesture (e.g., a long touch and hold of the information associated with Linda), the PTT service may cause the smart phone to immediately establish a PTT call with Linda and to display a user interface as shown to the right in FIG. 1. The user interface may enable the user to immediately communicate with Linda, via a PTT call and directly from the list of PTT contacts. As further shown to the right in FIG. 1, the user interface may include a visual indicator that provides an indication of connectivity and/or voice volume associated with the PTT call with Linda.

Systems and/or methods, described herein, may provide a PTT service that enables a UE to quickly and easily communicate with a PTT contact or a group of PTT contacts directly from a particular list view provided by the UE. The systems and/or methods may conserve or save processing resources associated with the UE since the UE does not need to access multiple user interfaces before establishing a communication with a PTT contact or a group of PTT contacts. The systems and/or methods may further conserve or save processing resources associated with the UE since the user may terminate a PTT call immediately if the visual indicator indicates that a quality of service (QoS) (e.g., a connectivity, a voice volume, or the like) associated with the PTT call is insufficient.

Figure 2:
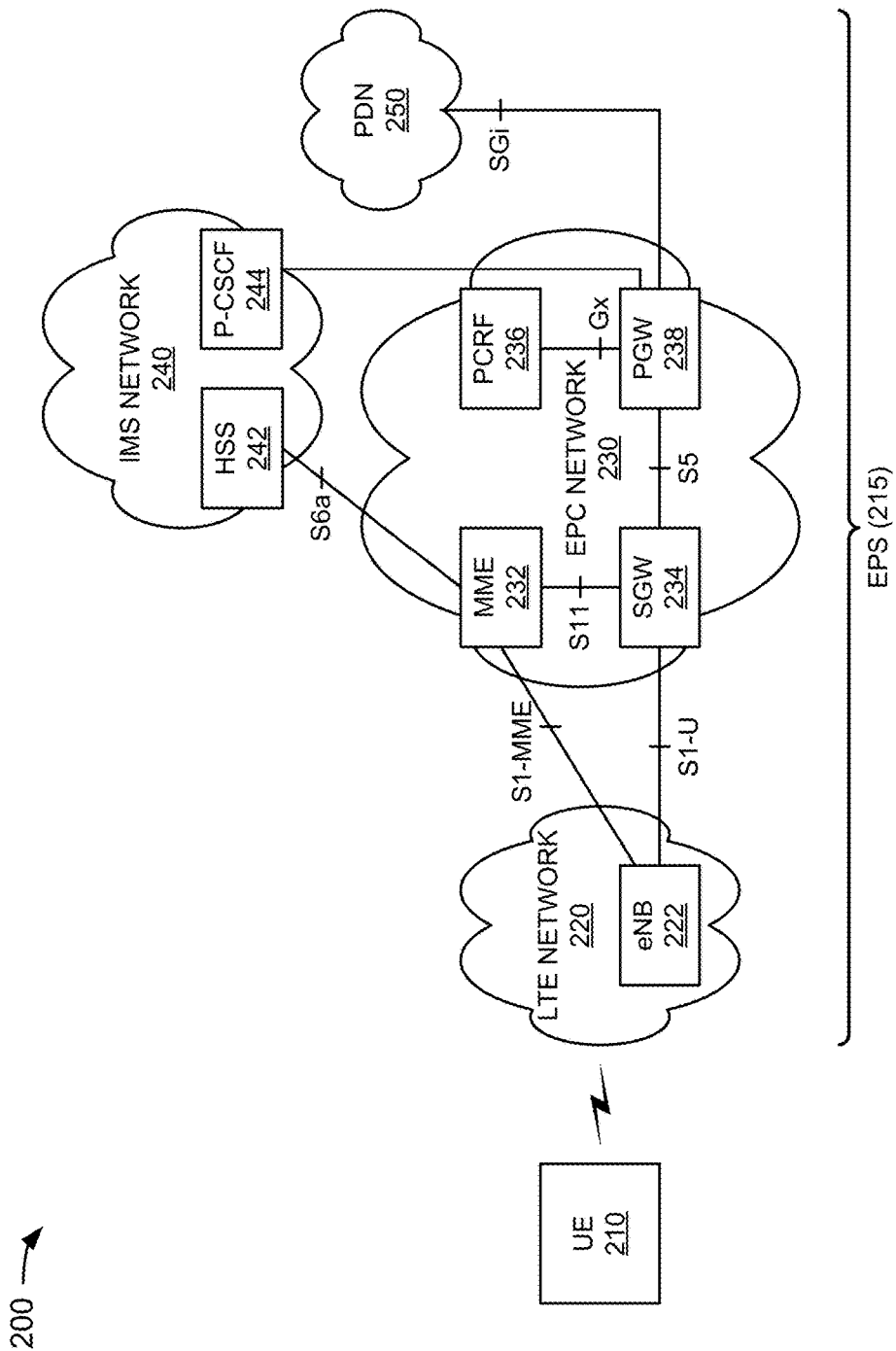
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include a user equipment (UE) 210 and an evolved packet system (EPS) 215 that includes a long term evolution (LTE) network 220, an evolved packet core (EPC) network 230, an Internet protocol (IP) multimedia subsystem (IMS) network 240, and/or a packet data network (PDN) 250. LTE network 220 may include an eNodeB (eNB) 222. EPC network 230 may include a mobility management entity (MME) 232, a serving gateway (SGW) 234, a policy and charging rules function (PCRF) server 236, and a PDN gateway (PGW) 238. IMS network 240 may include a home subscriber server (HSS) 242 and a proxy call session control function (P-CSCF) server 244. Devices/networks of environment 200 may connect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface, and may connect with HSS 242 over a S6a interface. SGW 234 may connect with PGW 238 over a S5 interface. PCRF server 236 may connect with PGW 238 over a Gx interface. PGW 238 may connect with PDN 250 over a SGi interface, and may connect with P-CSCF server 244. Other connections, not shown in FIG. 1, may also, or alternatively, be utilized by EPS 215. For example, multiple MMEs 232 may connect with one another over S10 interfaces.

UE 210 may include a device that is capable of communicating over LTE network 220, EPC network 230, and/or IMS network 240. In some implementations, UE 210 may include a radiotelephone; a personal communications service (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; or another type of computation and communication device.

EPS 215 may include is a core network architecture of the Third Generation Partnership Project (3GPP) LTE wireless communication standard. EPS 215 may include LTE network 220, EPC network 230, IMS network 240, and/or PDN 250. In some implementations, EPS 215 may be replaced with another network architecture capable of providing PTT communications, such as, for example, a second generation (2G) packet-switched network, a third generation (3G) packet-switched network, or the like.

LTE network 220 may include a communications network that connects user devices (e.g., UE 210) to a service provider network. In some implementations, LTE network 220 may be replaced with a wireless local area network (WLAN) or another type of access network (e.g., an evolved universal terrestrial radio access network (E-UTRAN) or an evolved high rate packet data (eHRPD) radio access network (RAN)). In some implementations, LTE network 220 may include a radio access network capable of providing a particular data rate, a particular latency, packet optimization, a particular capacity and coverage, etc.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include an IP packet-switched core network that supports high-speed wireless and wireline broadband access technologies. In some implementations, EPC network 230 may provide packet-switched voice services (e.g., which are traditionally circuit-switched) using IMS network 240 and PDN 250.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attachment to LTE network 220 and at a time of intra-LTE handover. In some implementations, MME 232 may authenticate UE 210. Non-access stratum (NAS) signaling may terminate at MME 232, and MME 232 may generate and allocate temporary identities to UEs 210. MME 232 may check authorization of UE 210 to utilize LTE network 220 and may enforce roaming restrictions for UE 210. MME 232 may be a termination point in EPC network 230 for ciphering/integrity protection for NAS signaling and may handle security key management. MME 232 may provide a control plane function for mobility between LTE network 220 and other access networks with a S3 interface terminating at MME 232.

SGW 234 may include one or more devices that route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, etc.). In some implementations, SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PCRF server 236 may include one or more computation and communication devices that provide policy control decision and flow based charging control functionalities. PCRF server 236 may provide network control regarding service data flow detection, gating, quality of service (QoS) and flow based charging, etc. In some implementations, PCRF server 236 may determine how a certain service data flow shall be treated, and may ensure that user plane traffic mapping and treatment is in accordance with a user's subscription profile.

PGW 238 may include one or more devices that provide connectivity of UE 210 to external packet data networks by being a traffic exit/entry point for UE 210. UE 210 may simultaneously connect to more than one PGW 238 for accessing multiple PDNs 250. PGW 238 may perform policy enforcement, packet filtering for each user, charging support, lawful intercept, and packet screening. PGW 238 may also act as an anchor for mobility between 3GPP and non-3GPP technologies. In some implementations, PGW 238 may include one or more traffic transfer devices (or network devices), such as a gateway, a router, a switch, a firewall, a NIC, a hub, a bridge, a proxy server, an OADM, or some other type of device that processes and/or transfers traffic.

IMS network 240 may include an architectural framework or network (e.g., a telecommunications network) for delivering IP multimedia services. In some implementations, IMS network 240 may include a standardized reference architecture that provides session control, a connection control and an applications services framework, and user and services data.

HSS 242 may include one or more computation and communication devices that provide a master user database that supports devices of IMS network 240 that handle calls. HSS 242 may contain subscription-related information (e.g., user profiles), may perform authentication and authorization of a user, and may provide information about a user's location and IP information.

P-CSCF server 244 may include one or more computation and communication devices that function as a proxy server for UE 210, where SIP signaling traffic to and from UE 210 may go through P-CSCF server 244. In some implementations, P-CSCF server 244 may validate and then forward requests from UE 210, and may process and forward responses to UE 210.

PDN 250 may include one or more data communications networks that are based on packet switching, as opposed to circuit switching that is used in public telephone networks. In some implementations, PDN 250 may be capable of communicating with UE 210 via PGW 238.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
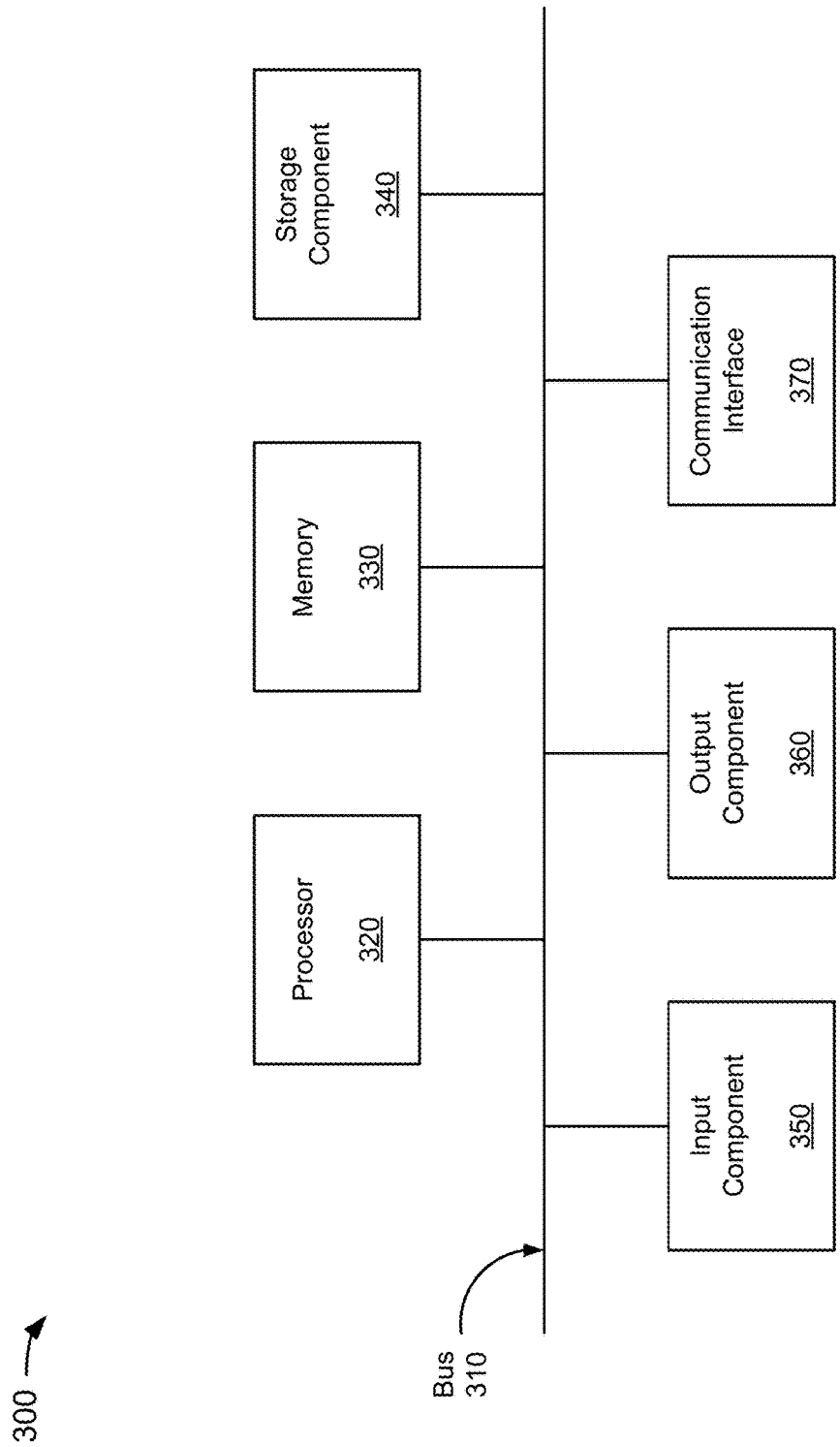
FIG. 3 is a diagram of example components of a device that may correspond to one or more of the devices of the environment depicted in FIG. 2.

FIG. 3 is a diagram of example components of a device 300. Device 300 may correspond to UE 210, eNB 222, MME 232, SGW 234, PCRF server 236, PGW 238, HSS 242, and/or P-CSCF server 244. In some implementations, UE 210, eNB 222, MME 232, SGW 234, PCRF server 236, PGW 238, HSS 242, and/or P-CSCF server 244 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interpret and executes instructions and can be programmed to perform a function. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
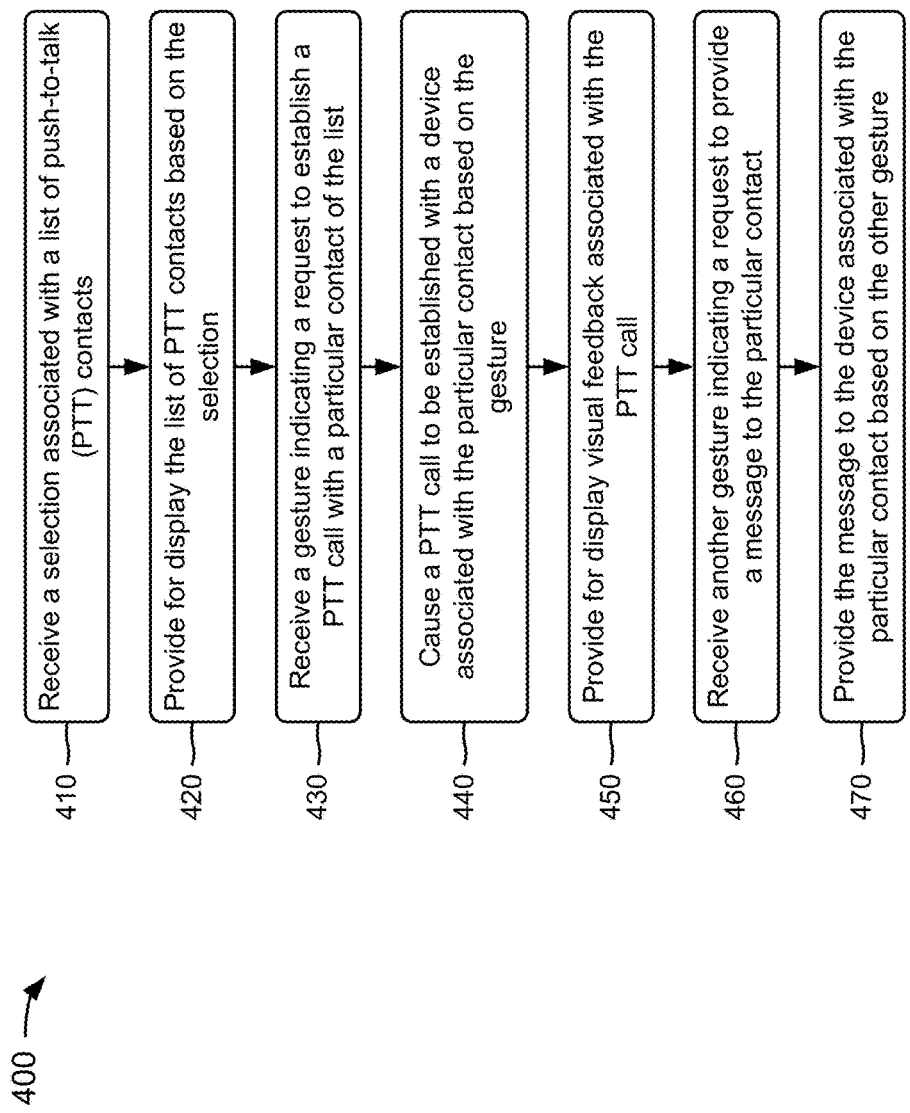
FIG. 4 is a flow chart of an example process for providing push-to-talk service features.

FIG. 4 is a flow chart of an example process 400 for providing push-to-talk service features. In some implementations, one or more process blocks of FIG. 4 may be performed by UE 210. In some implementations, one or more process blocks of FIG. 4 may be performed by another device or a group of devices separate from or including UE 210.

As shown in FIG. 4, process 400 may include receiving a selection associated with a list of push-to-talk (PTT) contacts (block 410). For example, UE 210 may provide multiple user interfaces that enable a user of UE 210 to access PTT service features. In some implementations, UE 210 may execute a PTT application, code snippet, script, widget, or the like, that causes UE 210 to provide the user interfaces. In some implementations, UE 210 may communicate with a device in EPS 215 that provides the PTT service features and/or the user interfaces to UE 210.

In some implementations, UE 210 (e.g., via the PTT service features) may provide a user interface that includes option icons associated with recent activity, favorites, PTT contacts, PTT groups, settings of the user, or the like. When the recent activity icon is selected by the user, UE 210 may provide a user interface that includes information associated with recent PTT activity of the user. The user may utilize swipe left or swipe right gestures or may select other option icons to access the other option icons. When the favorites icon is selected by the user, UE 210 may provide a user interface that includes a list of the user's favorite PTT contacts and/or groups of PTT contacts. When the PTT contacts icon is selected by the user, UE 210 may provide a user interface that includes a list of the user's PTT contacts. When the PTT groups icon is selected by the user, UE 210 may provide a user interface that includes a list of the user's groups of PTT contacts. When the settings icon is selected by the user, UE 210 may provide a user interface that includes settings for the PTT application.

In one example, assume that the user selects the PTT contacts icon, and that UE 210 receives a selection of the PTT contacts icon. In such an example, UE 210 may receive the selection of the PTT contacts icon via a touch gesture of the PTT contacts icon, a swipe left gesture until the PTT contacts icon is highlighted, or a swipe right gesture until the PTT contacts icon is highlighted.

As further shown in FIG. 4, process 400 may include providing for display a list of PTT contacts based on the selection (block 420). For example, UE 210 may provide for display a list of the user's PTT contacts based on the received selection. In some implementations, UE 210 may receive a selection of the favorites icon by the user, and UE 210 may display a user interface that includes a list of the user's favorite PTT contacts and/or groups of PTT contacts. In some implementations, UE 210 may receive a selection of the PTT contacts icon by the user, and UE 210 may display a user interface that includes a list of the user's PTT contacts. In some implementations, UE 210 may receive a selection of the PTT groups icon by the user, and UE 210 may display a user interface that includes a list of the user's groups of PTT contacts.

As further shown in FIG. 4, process 400 may include receiving a gesture indicating a request to establish a PTT call with a particular contact of the list (block 430). For example, UE 210 may receive, from the user, a gesture indicating a request to establish a PTT call with a particular PTT contact of the list of the user's PTT contacts. In some implementations, the user may utilize a gesture, such as a long touch and hold, a touch and a swipe (e.g., a swipe left, a swipe right, a swipe down, a swipe up, etc.), a double touch, a touch and a long touch, a touch and a voice command, a voice command and a touch, or the like, of information associated with the particular PTT contact. In some implementations, the gesture may enable UE 210 to quickly communicate with the particular PTT contact directly from the list of the user's PTT contacts. In some implementations, UE 210 may enable the user to access one or more levels associated with a group of PTT contacts, and may cause UE 210 to display a list of PTT contacts associated with the group. In such implementations, the user may utilize the gesture to quickly establish PTT communications with all of the PTT contacts in the group, a single PTT contact in the group, or a portion of the PTT contacts in the group, directly from within the list of the PTT contacts in the group.

UE 210 may also enable the user to begin a PTT communication session with the particular PTT contact by accessing one or more levels associated with the particular PTT contact. For example, the user may select the particular PTT contact from the list of the user's PTT contacts, and UE 210 may display information associated with the particular PTT contact, such as an image of the particular PTT contact, a telephone number of the particular PTT contact, a home address of the particular PTT contact, an email address of the particular PTT contact, an option to establish a PTT call with the particular PTT contact, or the like. If the user selects the option to establish a PTT call with the particular PTT contact, UE 210 may establish a PTT call with a UE 210 associated with the particular PTT contact.

As further shown in FIG. 4, process 400 may include causing a PTT call to be established with a device associated with the particular contact based on the gesture (block 440). For example, UE 210 may cause a PTT call to be established with a device (e.g., a UE 210) associated with the particular PTT contact based on the gesture. In some implementations, after establishing the PTT call with the particular PTT contact's device or while establishing the PTT call with the particular PTT contact's device, UE 210 may display a user interface to the user. The user interface may include information that enables the user to conduct a PTT session with the particular PTT contact. For example, the user interface may include a mechanism (e.g., an image, a button, an icon, or the like) that, when selected or held, enables the user to talk to the particular PTT contact. When the mechanism is selected again or released, the user may receive a voice communication from the particular PTT contact. UE 210 associated with the particular contact may receive the PTT call request from UE 210 associated with the user, and may open a PTT application based on the PTT call request. If the particular contact accepts the PTT call request, the PTT call may be established between UE 210 associated with the particular contact and UE 210 associated with the user.

In some implementations, if the user selects a particular group of PTT contacts from the user's list of groups of PTT contacts, UE 210 may cause a PTT call to be established with devices (e.g., UEs 210) associated with the contacts of the particular PTT group. In such implementations, UE 210 may interact with EPS 215 (e.g., with a server device in IMS network 240) to establish a PTT call with UEs 210 associated with the particular group. A contact in the particular group and/or the user can communicate with the particular group and/or the user by simply pressing a button and speaking when UE 210 indicates it is alright to do so. The contact and/or the user may release the button when he or she is done speaking. When the contact and/or the user begins to speak, the server device in IMS network 240 may allocate resources and notify other users in the PTT call that the contact/user is speaking. The server device may deliver the speech packets to all UEs 210 in the PTT call. In some implementations, after establishing the PTT call with the particular PTT group's devices or while establishing the PTT call with the particular PTT group's devices, UE 210 may display a user interface to the user. The user interface may include information that enables the user to conduct a PTT session with the contacts of the particular PTT group. For example, the user interface may include a mechanism (e.g., an image, a button, an icon, or the like) that, when selected or held, enables the user to talk to one or more contacts of the particular PTT group. When the mechanism is selected again or released, the user may receive a voice communication from one or more contacts of the particular PTT group.

In some implementations, UE 210 may determine whether a QoS (e.g., a connection quality, a voice volume, or the like) of the device associated with the particular PTT contact satisfies a particular QoS threshold (e.g., a particular connection speed, a particular connection quality, a particular decibel level, or the like). UE 210 may determine a QoS of the device prior to a PTT call by establishing a connection with the device and determining the QoS of the device via the connection. If the QoS of the device associated with the particular PTT contact satisfies the particular QoS threshold, UE 210 may establish the PTT call with the device associated with the particular PTT. If the QoS of the device associated with the particular PTT contact fails to satisfy the particular QoS threshold, UE 210 may not establish the PTT call with the device associated with the particular PTT and may provide, to the user, a message indicating that the PTT call could not be established. This saves processing resources of UE 210 by not establishing a PTT call unless the QoS of the device associated with the particular PTT contact is a particular QoS.

As further shown in FIG. 4, process 400 may include providing for display visual feedback associated with the PTT call (block 450). For example, UE 210 may display, in the user interface that enables the user to conduct a PTT session, visual feedback associated with the PTT call. In some implementations, when the user is talking to the particular PTT contact or receiving a voice communication from the particular PTT contact, UE 210 may display, in the user interface, visual feedback that tracks the voice of the user or the particular PTT contact with visual feedback similar to an equalizer of a stereo. The visual feedback may indicate to the user that the user and the particular PTT contact are connected, and that the voice and/or voice volume are audible to the user and the particular PTT contact. In some implementations, the visual feedback may include a number indicating a decibel level of the voice and/or voice volume or connectivity with the particular PTT contact; a color indicating a decibel level of the voice and/or voice volume or connectivity with the particular PTT contact; or the like. In some implementations, the feedback may include audio feedback that indicates to the user that the user and the particular PTT contact are connected, and that the voice and/or voice volume are audible to the user and the particular PTT contact.

In some implementations, when the user is talking to the particular PTT group or receiving a voice communication from a contact of the particular PTT group, UE 210 may display, in the user interface, visual feedback or audio feedback that tracks the voice of the user or the contact of the particular PTT group. The visual feedback or the audio feedback may indicate to the user that the user and the selected PTT group are connected, and that the voice and/or voice volume are audible to the user and the selected PTT group. In some implementations, the user interface may indicate which contact of the particular PTT group is speaking since UE 210 may detect which UE 210 is a source of a voice and may identify which contact is associated with the source UE 210. In some implementations, the user may speak privately with one contact of the particular PTT group by changing from a one-to-many PTT call to a one-to-one PTT call on the fly.

As further shown in FIG. 4, process 400 may include receiving another gesture indicating a request to provide a message to the particular contact (block 460). For example, UE 210 may receive, from the user, another gesture indicating a request to provide a message to the particular PTT contact. In some implementations, UE 210 may display a user interface that includes information that enables the user to send an alert or a message to the particular PTT contact. In such implementations, the user may utilize a gesture, such as a touch of the information, to enable the user to send an alert or a message to the particular PTT contact.

For example, UE 210 may display, in the user interface, a mechanism (e.g., a link, an icon, a button, or the like) that enables the user to send an alert or a message to the particular PTT contact. When the mechanism is selected by the user, UE 210 may enable the user to input (e.g., via voice commands or textual input) an alert or a message to be sent to the particular PTT contact. In some implementations, when the mechanism is selected by the user, UE 210 may provide a list of predefined alerts or messages (e.g., previously input by the user or pre-established for UE 210). In such implementations, the user may select, from the list, one or more of the predefined alerts or messages to be sent to the particular PTT contact. In some implementations, UE 210 may send a group alert or message to contacts in a particular PTT group utilizing the mechanism. Such implementations may enable the user to quickly communicate a message to the particular PTT group. In some implementations, the user may privately send an alert or a message to one contact of the particular PTT group by changing from a one-to-many PTT session to a one-to-one PTT session on the fly.

As further shown in FIG. 4, process 400 may include providing the message to the device associated with the particular contact based on the other gesture (block 470). For example, UE 210 may provide the message to the device associated with the particular PTT contact based on the other gesture. In some implementations, UE 210 may provide the message to the device associated with the particular PTT contact via a PTT message, a short message service (SMS) message, a multimedia messaging service (MMS) message, a text message, an email message, a voicemail message, or the like. In some implementations, if the user selects and holds a particular group of PTT contacts from the user's list of groups of PTT contacts, UE 210 may broadcast the message to one or more devices associated with contacts of the particular PTT group via a PTT message, a SMS message, a MMS message, a text message, an email message, a voicemail message, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
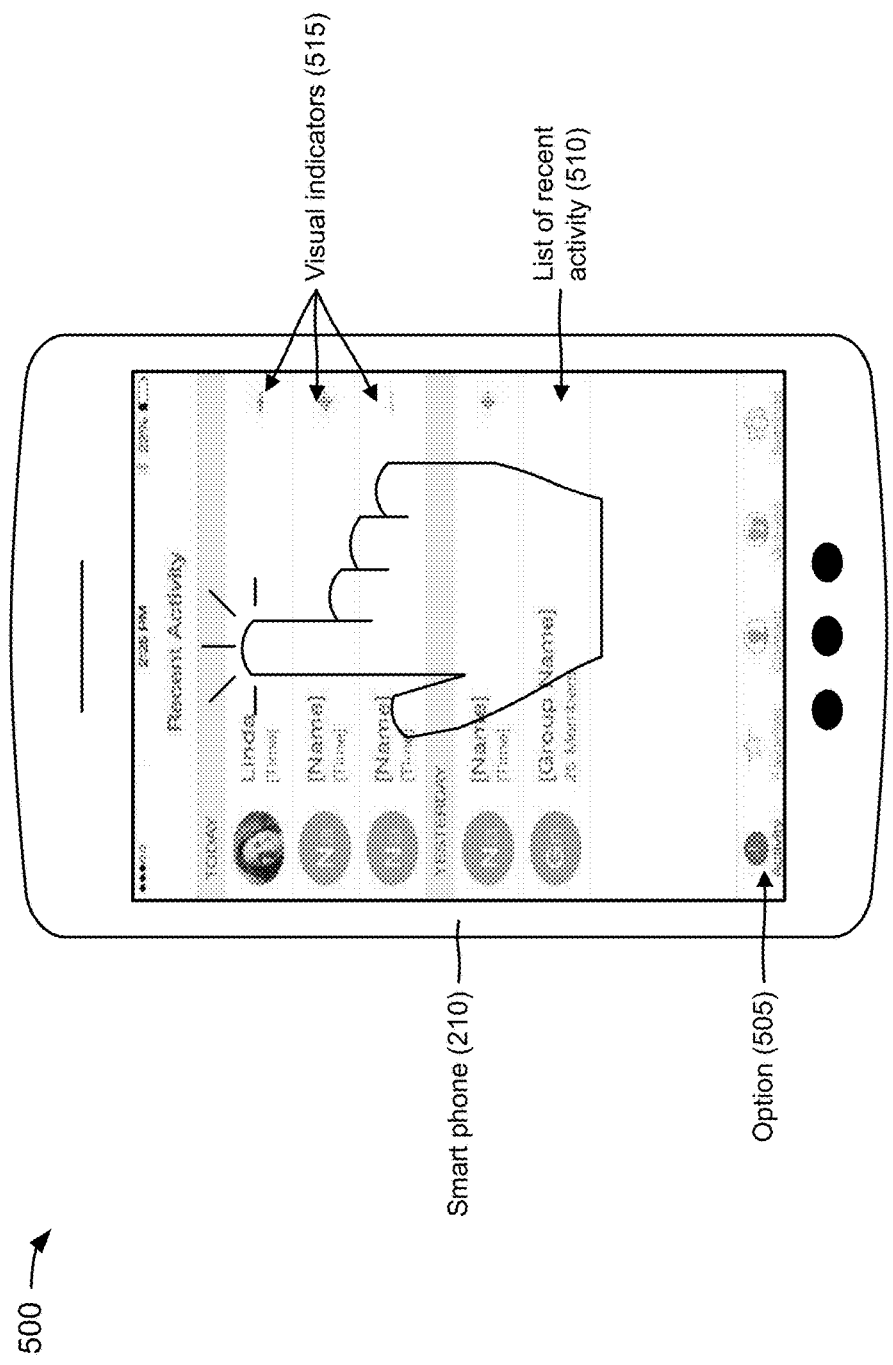
FIGS. 5A-5H are diagrams of an example relating to the example process shown in FIG. 4.

FIGS. 5A-5H are diagrams of an example 500 relating to example process 400 shown in FIG. 4. Assume that a user of UE 210 (e.g., a smart phone) accesses a PTT service that provides the user interfaces depicted in FIGS. 5A-5H. As shown in FIG. 5A, smart phone 210 may display a user interface that includes information associated with recent PTT activity of the user. For example, the user interface may include an option 505 that, when selected, causes a list 510 of recent PTT contacts and/or groups of PTT contacts that the user conducted PTT sessions with at a particular time, such as today, yesterday, or the like, to be displayed.

As further shown in FIG. 5A, the user interface may include visual indicators 515 that provide indications of QoS (e.g., connectivity, availability, signal quality, or the like) associated with PTT contacts. For example, each of visual indicators 515 may include a visual equalizer that tracks a voice volume with visual feedback. The visual feedback may provide an indication of whether a PTT contact is available, and whether a signal quality with the PTT contact is sufficient (e.g., whether the user's voice and/or voice volume will be heard by the PTT contact) if a PTT call is established with the PTT contact. For example, a green, larger diamond-shaped visual indicator may indicate that the PTT contact is available, and that the user's voice and/or voice volume will be heard by the PTT contact (e.g., sufficient signal quality). A red, smaller diamond-shaped visual indicator may indicate that the PTT contact is available, but that the user's voice and/or voice volume may not be heard by the PTT contact (e.g., possibly insufficient signal quality). A gray, flat-lined visual indicator may indicate that the PTT contact is not available (e.g., insufficient signal quality).

Figure 5B:
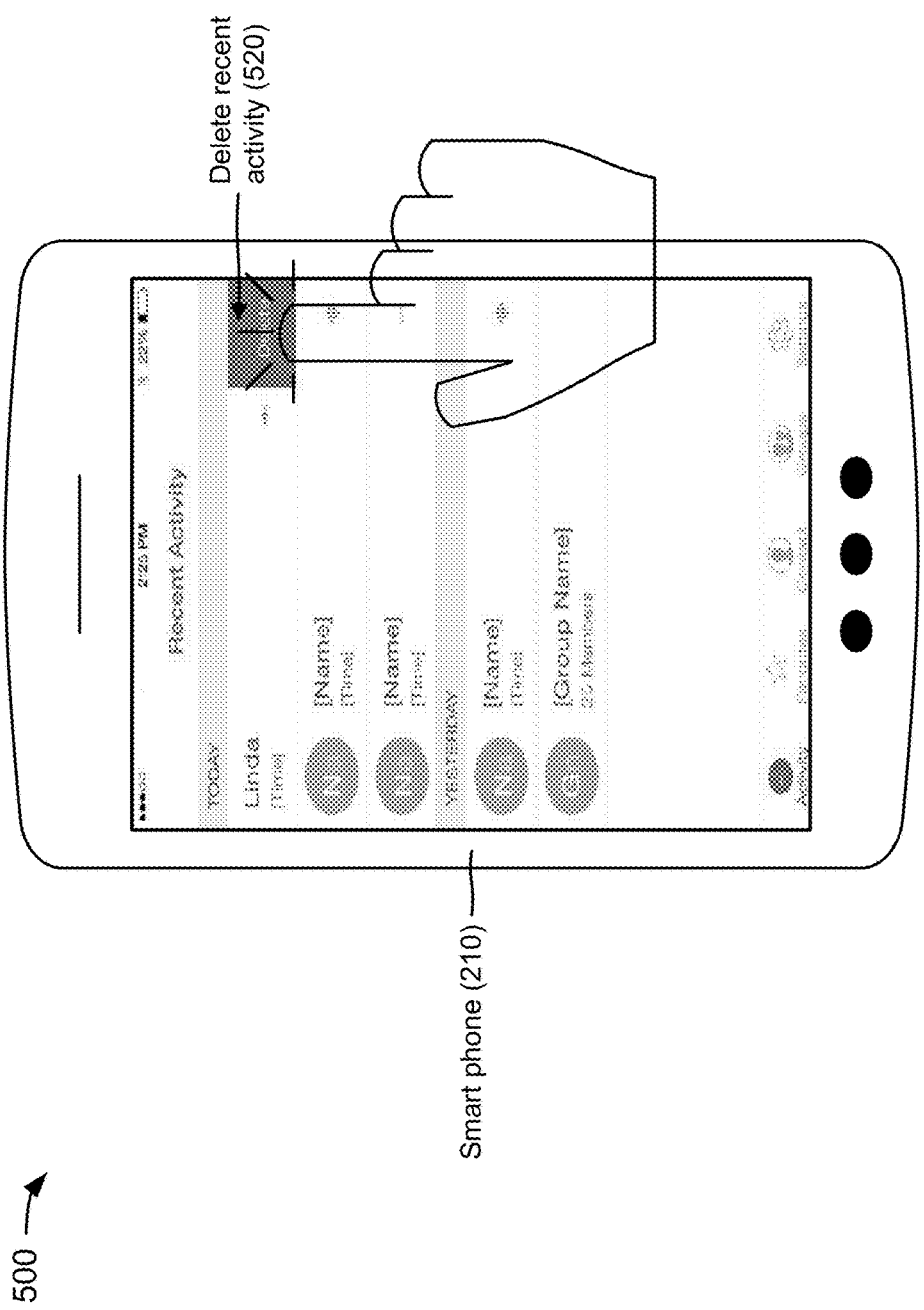

As further shown in FIG. 5A, the user may utilize a touch gesture of the user interface to select one of the PTT contacts or groups of PTT contacts provided by the user interface. For example, the user may select information associated with a PTT contact named Linda via the touch gesture. When the user selects the information associated with Linda via a type of gesture (e.g., a select and swipe left or right gesture), smart phone 210 may display a user interface as shown in FIG. 5B. As further shown in FIG. 5B, the user interface may provide a delete mechanism 520 (e.g., a delete button, icon, link, or the like) to remove the information associated with Linda from list 510 of recent PTT activity of the user. If the user selects delete mechanism 520, smart phone 210 may cause the information associated with Linda to be removed from list 510 of recent PTT activity of the user.

Figure 5C:
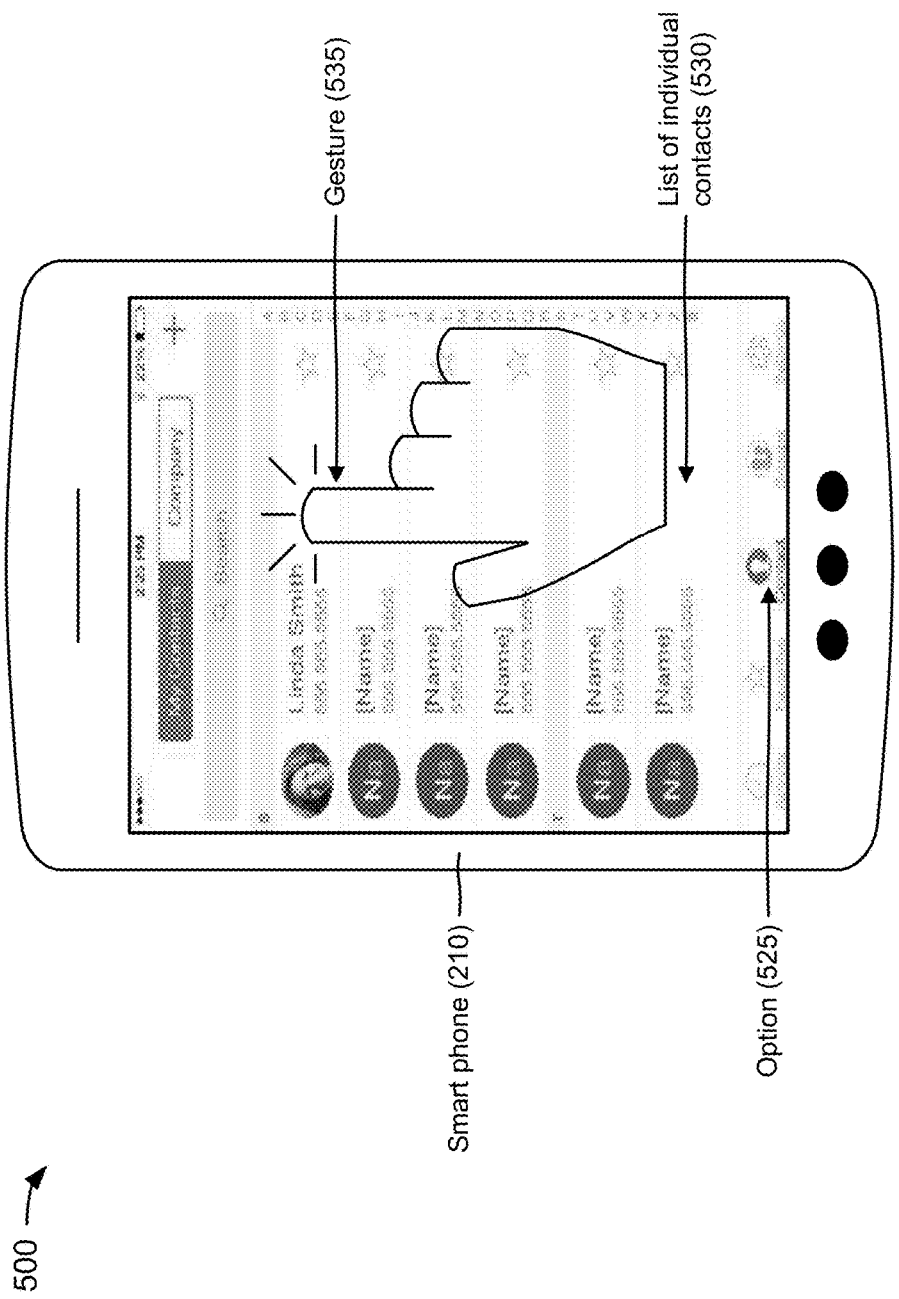
Figure 5D:
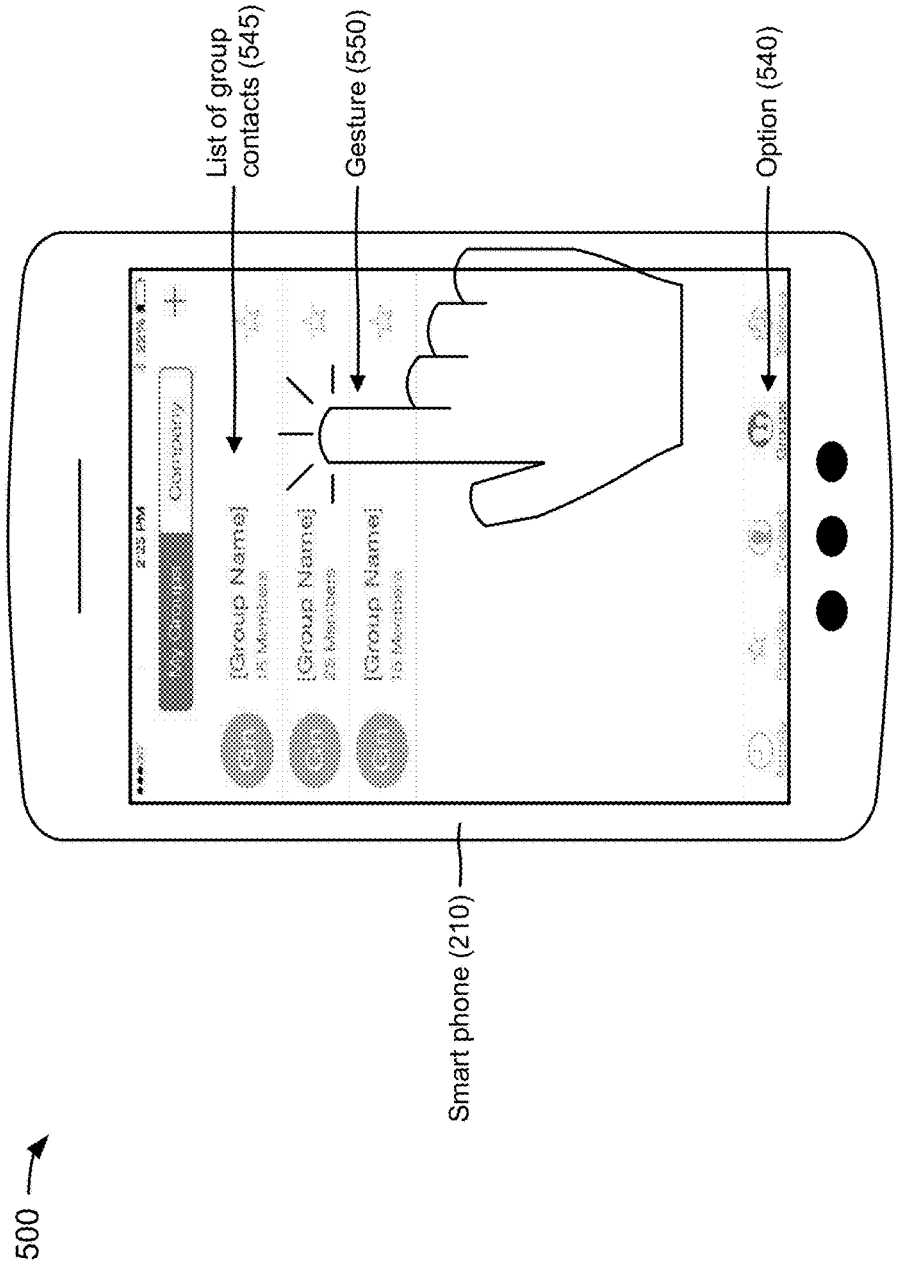

As further shown in FIG. 5B, a bottom portion of the user interface may include option icons associated with Recent Activity, Favorites, PTT Contacts, PTT Groups, and/or Settings of the user. The Recent Activity icon may be accessed and highlighted, as shown in FIGS. 5A and 5B, when the user is accessing the information associated with recent PTT activity of the user. The user may utilize swipe left gestures, swipe right gestures, or selection gestures to access the other icons provided at the bottom portion of the user interface of FIG. 5B. When the Favorites icon is accessed, smart phone 210 may display the user's favorite PTT contacts and/or groups of PTT contacts. When the PTT Contacts icon is accessed, smart phone 210 may display a list of the user's PTT contacts, as shown in FIG. 5C and described below. When the PTT Groups icon is accessed, smart phone 210 may display a list of the user's groups of PTT contacts, as shown in FIG. 5D and described below. When the Settings icon is accessed, smart phone 210 may display settings for the PTT application.

Assume that the user utilizes a swipe left gesture to access the PTT Contacts icon. When the PTT Contacts icon is accessed, smart phone 210 may display a user interface as shown in FIG. 5C. The user interface may highlight a PTT Contacts option 525 and may include a list 530 of the user's PTT contacts arranged in a particular order (e.g., alphabetically by first name, alphabetically by last name, based on recent PTT activity, based on frequency of communication, or the like). Assume that the user utilizes a gesture 535 (e.g., a long touch and hold of information associated with a PTT contact) to quickly communicate with any PTT contact in list 530 of the user's PTT contacts, directly from list 530 of the user's PTT contacts. For example, assume that the user utilizes gesture 535 with information associated a PTT contact named Linda Smith.

Now assume that the user utilizes a swipe left gesture to access the PTT Groups icon. When the PTT Groups icon is accessed, smart phone 210 may display a user interface as shown in FIG. 5D. The user interface may highlight a PTT Groups option 540 and may include a list 545 of the user's groups of PTT contacts arranged in a particular order (e.g., alphabetically by group name, based on recent PTT activity, based on frequency of communication, or the like). Assume that the user utilizes a gesture 550 (e.g., a long touch and hold of information associated with a PTT group) to quickly communicate with a group of PTT contacts, directly from list 545 of the user's groups of PTT contacts. For example, assume that the user utilizes gesture 550 with information associated with a PTT group that includes twenty-five members.

Figure 5E:
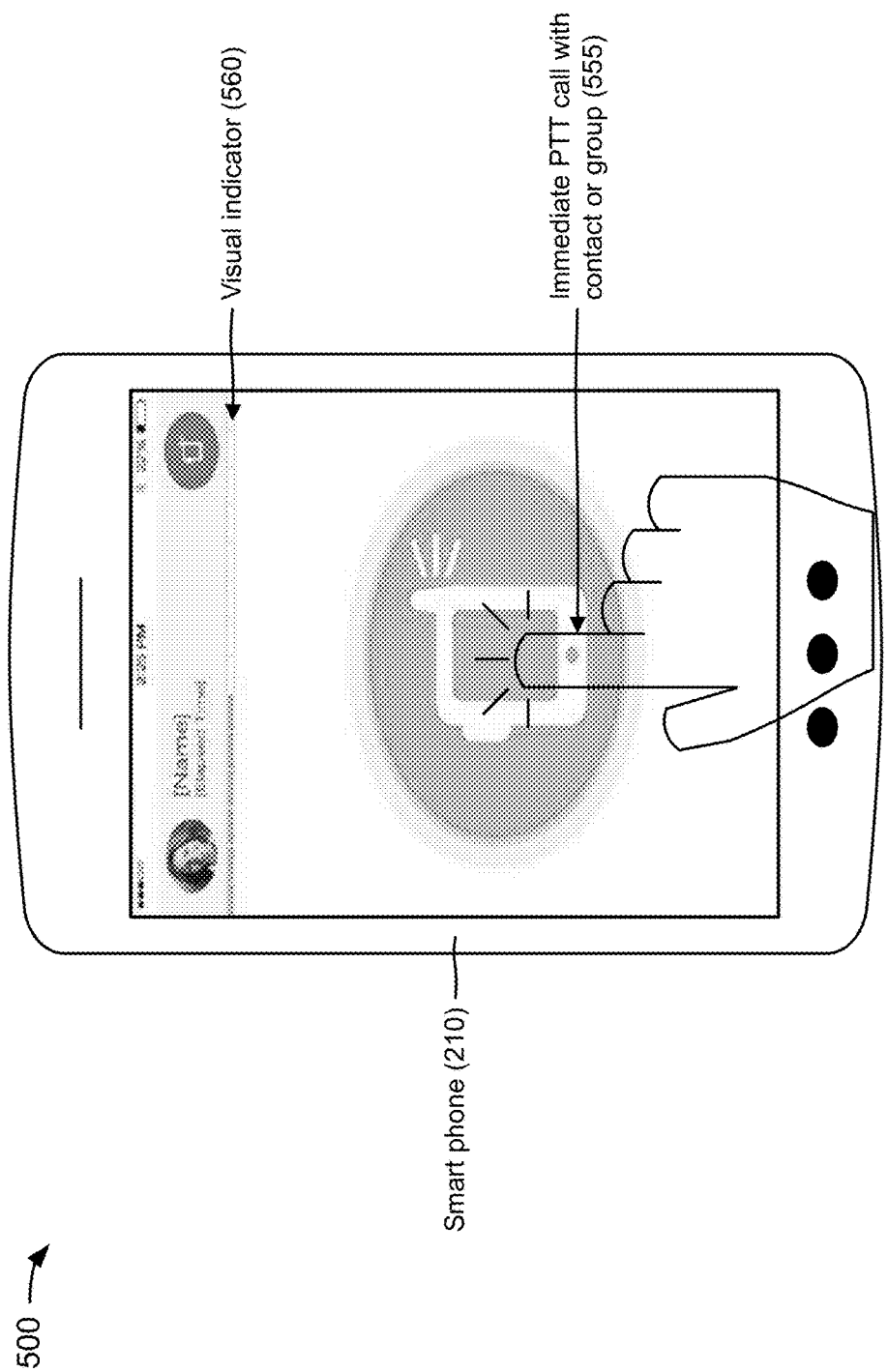

If the user selects and holds a PTT contact from list 530 of the user's PTT contacts, as shown in FIG. 5C, or selects and holds a PTT group from list 545 of the user's PTT groups, as shown in FIG. 5D, smart phone 210 may display a user interface as shown in FIG. 5E. In some implementations, the user interface of FIG. 5E may be displayed in one or more portions of the user interfaces depicted in FIGS. 5C and 5D. The user interface may include information that enables the user to conduct a PTT session with the selected PTT contact or the selected PTT group, as indicated by reference number 555. For example, the user interface may include a mechanism (e.g., a button, an icon, a link, or the like) that, when selected or held, enables the user to talk to the selected PTT contact or the selected PTT group. When the mechanism is selected again or released, the user may receive a voice communication from the selected PTT contact or from a contact in the selected PTT group. When the user is talking to the selected PTT contact/PTT group or receiving a voice communication from the selected PTT contact/PTT group, the user interface of FIG. 5E may include a visual indicator 560 that tracks the voice of the user, the selected PTT contact, or a contact of selected PTT group with visual feedback. The visual feedback may indicate to the user that the user and the selected PTT contact/PTT group are connected, and that the voice and/or voice volume are audible to the user and the selected PTT contact/PTT group.

Figure 5F:
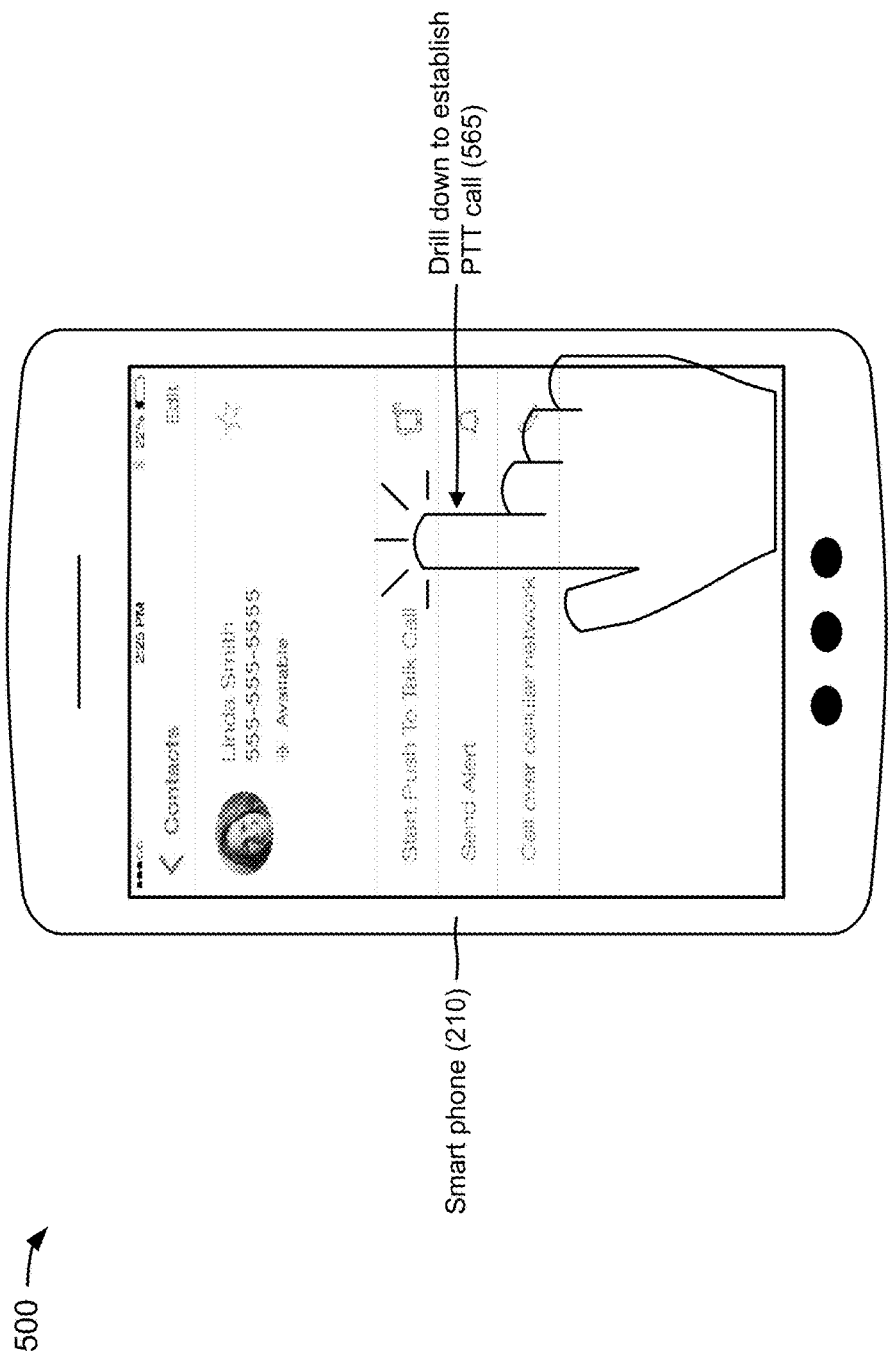

If the user selects (without holding) a PTT contact (e.g., Linda Smith) from list 530 of the user's PTT contacts, as shown in FIG. 5C, smart phone 210 may display a user interface as shown in FIG. 5F. The user interface may include information associated with Linda Smith. For example, the user interface may include a picture of Linda Smith, a telephone number associated with Linda Smith, a visual indicator that indicates an availability of Linda Smith, or the like. The user interface may also include information that enables the user to start a PTT call with Linda Smith, as indicated by reference number 565, send an alert or a message to Linda Smith, call Linda Smith over a cellular network, or the like. If the user selects the information that enables the user to start a PTT call with Linda Smith, smart phone 210 may establish a PTT call with a device associated with Linda Smith and may display the user interface shown in FIG. 5E.

Figure 5G:
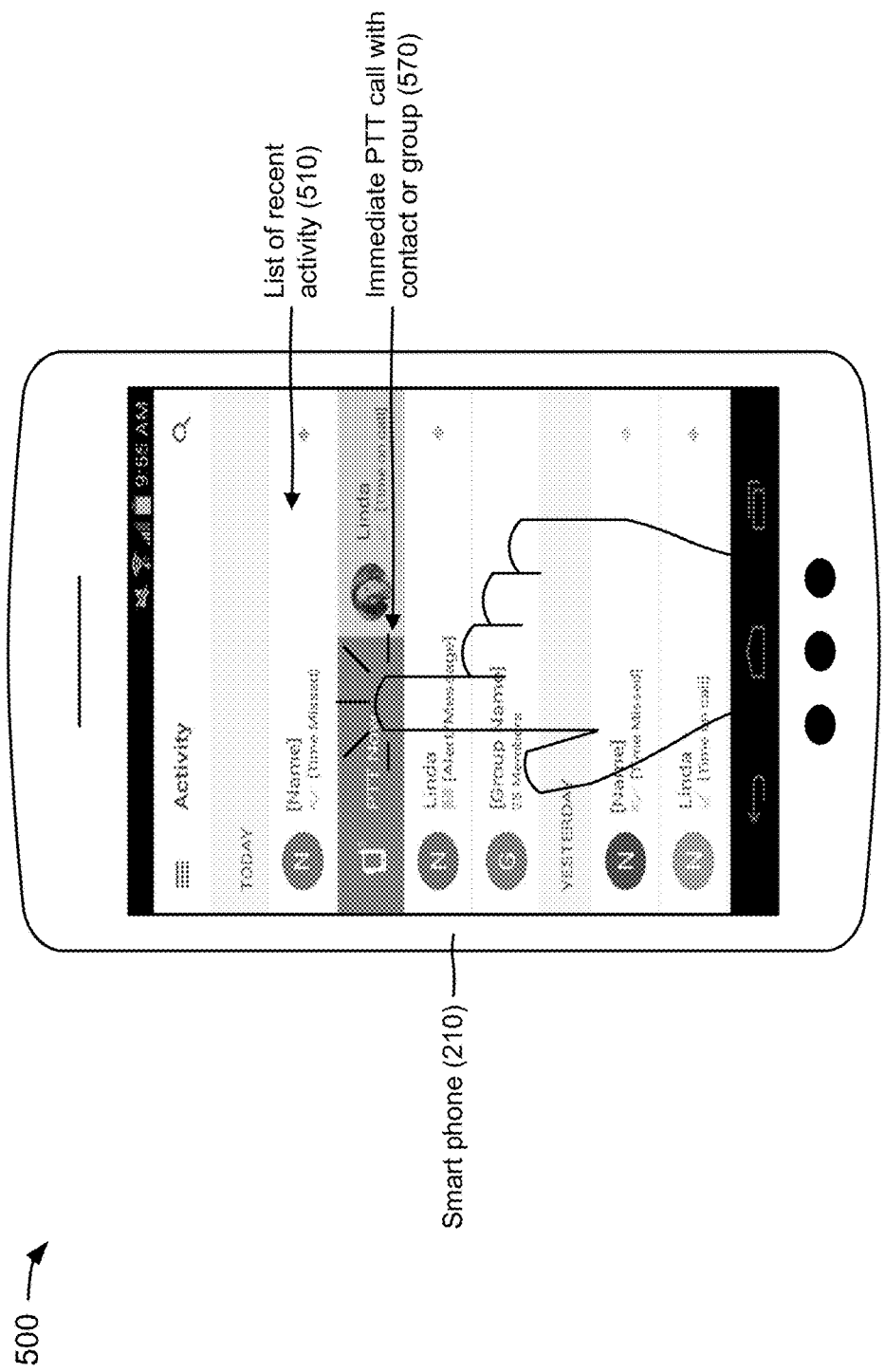

Now assume that the user utilizes a swipe right gesture to once again access the Recent Activity icon. When the Recent Activity icon is accessed, smart phone 210 may display a user interface, as shown in FIG. 5G, which includes list 510 of recent PTT activity of the user. For example, the user interface may include information associated with recent PTT contacts and/or groups of PTT contacts that the user conducted PTT sessions with at a particular time, such as today, yesterday, or the like. As further shown in FIG. 5G, the user may utilize a gesture (e.g., a hold and swipe left gesture of information associated with a PTT contact) to quickly begin a PTT call with a PTT contact named Linda, directly from list 510 of recent PTT activity. Based on the hold and swipe left gesture, smart phone 210 may establish a PTT call with a device associated with Linda, as indicated by reference number 570. Smart phone 210 may conserve processing resources since smart phone 210 need not access multiple user interfaces before establishing the PTT call with the device associated with Linda.

Figure 5H:
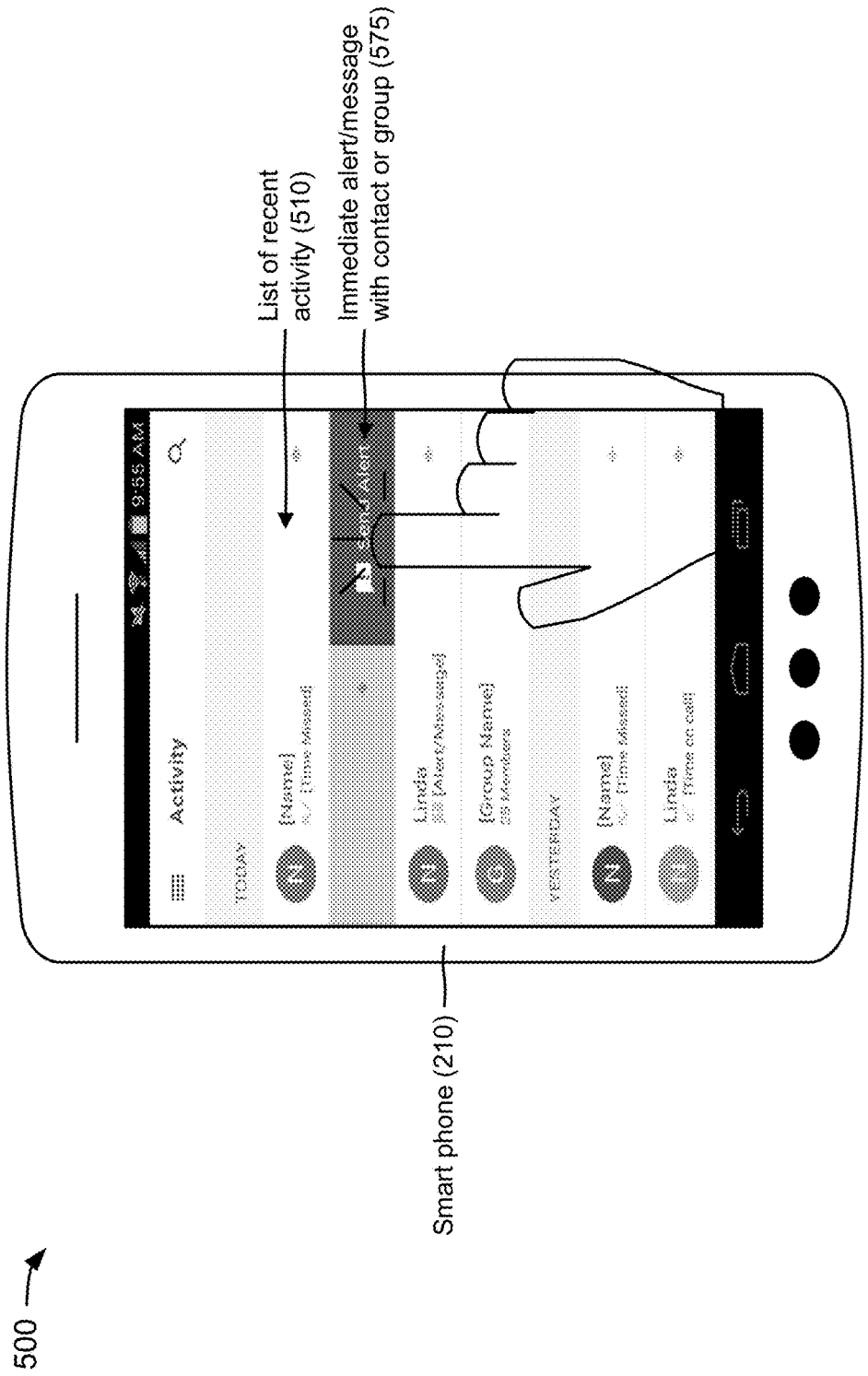

Alternatively, as shown in a user interface of FIG. 5H, the user may utilize a gesture (e.g., a hold and swipe right gesture of information associated with a PTT contact) to quickly send a PTT message or alert to the PTT contact named Linda, directly from list 510 of recent PTT activity. Based on the hold and swipe right gesture, smart phone 210 may enable the user to input a voice message or alert, a text message or alert, or the like, and to send the message or alert to a device associated with Linda, as indicated by reference number 575. In some implementations, the functionality described in connection with FIGS. 5G and 5H may also be performed from list 530 of PTT contacts, as shown in FIG. 5C, and from list 545 of groups of PTT contacts, as shown in FIG. 5D.

As indicated above, FIGS. 5A-5H are provided merely as an example. Other examples are possible and may differ from what was described with regard to FIGS. 5A-5H. In some implementations, the various operations described in connection with FIGS. 5A-5H may be performed automatically or at the request of a user.

Systems and/or methods, described herein, may enable a user of a UE to utilize a particular gesture to quickly and easily communicate with a PTT contact or a group of PTT contacts directly from a particular list view provided by the UE. The systems and/or methods may conserve or save processing resources associated with the UE since the UE does not need to access multiple user interfaces before establishing a communication with a PTT contact or a group of PTT contacts. The systems and/or methods may further conserve or save processing resources associated with the UE since the user may terminate a PTT call immediately if a visual indicator indicates that a QoS associated with the PTT call is insufficient.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like), and/or may not be user-configurable. Information associated with the user interfaces may be selected and/or manipulated by a user (e.g., via a touch screen display, a mouse, a keyboard, a keypad, voice commands, or the like). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a selection associated with a list of push-to-talk contacts;
   providing for display, by the device, the list of push-to-talk contacts based on the selection;
   providing for display, by the device, a corresponding visual indicator with each contact in the list of push-to-talk contacts,
      each corresponding visual indicator providing visual feedback for a signal quality associated with each corresponding contact, prior to a push-to-talk call being established;
   receiving, by the device, a gesture indicating a request to establish the push-to-talk call with a particular contact from within the list of push-to-talk contacts;
   automatically initiating, by the device, the push-to-talk call with another device associated with the particular contact,
      the push-to-talk call being initiated with the other device when a quality of service of the other device satisfies a quality of service threshold,
      the quality of service threshold being associated with:
         a particular connection speed,
         a particular connection quality, and
         a particular decibel level; and providing for display, by the device, a visual voice indicator associated with the push-to-talk call, after the push-to-talk call is established,
the visual voice indicator comprising a visual equalizer that tracks a voice of a user of the device or a voice of the particular contact.

2. The method of claim 1, where the visual voice indicator provides visual feedback for a particular quality of service associated with the push-to-talk call.

3. The method of claim 1, further comprising:
receiving another gesture indicating a request to provide a message to the particular contact; and
providing, based on the other gesture, the message to the other device associated with the particular contact.

4. The method of claim 1, where the list of push-to-talk contacts includes a list of groups of push-to-talk contacts and the particular contact includes a particular group of the list of groups of push-to-talk contacts.

5. The method of claim 1, where the gesture includes a touch and hold of information associated with the particular contact.

6. A device, comprising:
one or more processors to:
provide a user interface that includes a list of push-to-talk contacts;
provide, in the user interface, a corresponding visual indicator with each contact in the list of push-to-talk contacts,
each corresponding visual indicator providing visual feedback for a signal quality associated with each corresponding contact, prior to a push-to-talk call being established;
receive, via the user interface, a gesture indicating a request to establish the push-to-talk call with a particular contact in the list of push-to-talk contacts;
automatically initiate the push-to-talk call with another device associated with the particular contact,
the push-to-talk call being initiated with the other device when a quality of service of the other device satisfies a quality of service threshold,
the quality of service being associated with;
a particular connection speed,
a particular connection quality, and
a particular decibel level; and
provide for display a visual voice indicator associated with the push-to-talk call, after the push-to-talk call is established,
the visual voice indicator comprising a visual equalizer that tracks a voice of a user of the device or a voice of the particular contact.

7. The device of claim 6, where the visual voice indicator provides visual feedback for a particular quality of service associated with the push-to-talk call.

8. The device of claim 6, where the one or more processors are to:
receive another gesture indicating a request to provide a message to the particular contact; and
provide, based on the other gesture, the message to the other device associated with the particular contact.

9. The device of claim 6, where the list of push-to-talk contacts includes a list of push-to-talk contacts contacted within a particular time period and the particular contact includes a particular push-to-talk contact contacted within the particular time period.

10. The device of claim 6, where the gesture includes a touch and a swipe of information associated with the particular contact.

11. A computer-readable medium for storing instructions, the instructions comprising:
one or more instructions that, when executed by one or more processors of a first device, cause the one or more processors to:
provide a user interface that includes a list of push-to-talk contacts;
provide, in the user interface, a corresponding visual indicator with each contact in the list of push-to-talk contacts,
each corresponding visual indicator providing visual feedback for a signal quality associated with each corresponding contact, prior to a push-to-talk communication being established;
receive, via the user interface, a gesture indicating a request to establish the push-to-talk communication with a particular contact in the list of push-to-talk contacts;
automatically initiate, from within the user interface, the push-to-talk communication between the first device and a second device associated with the particular contact,
the push-to-talk communication being initiated between the first device and the second device when a quality of service of the second device satisfies a quality of service threshold,
the quality of service threshold being associated with;
a particular connection speed,
a particular connection quality, and
a particular decibel level; and
provide for display a visual voice indicator associated with the push-to-talk communication, after the push-to-talk communication is established,
the visual voice indicator comprising a visual equalizer that tracks a voice of a user of the first device or a voice of the particular contact.

12. The computer-readable medium of claim 11, where the visual voice indicator provides visual feedback for a particular quality of service associated with the push-to-talk communication.

13. The computer-readable medium of claim 11, where each corresponding visual indicator includes one of:
a first visual indicator indicating that a corresponding contact is available, and that a sufficient signal quality is established with the corresponding contact,
a second visual indicator indicating that the corresponding contact is available, and that an insufficient signal quality is established with the corresponding contact, or
a third visual indicator indicating that the corresponding contact is not available.

14. The computer-readable medium of claim 11, where the list of push-to-talk contacts includes a list of groups of push-to-talk contacts and the particular contact includes a articular group of the list of groups of push-to-talk contacts.

15. The computer-readable medium of claim 11, where the gesture includes a touch and hold of information associated with the particular contact.

16. The method of claim 2, where the particular quality of service is associated with at least one of:
a connectivity associated with the push-to-talk call, or
a voice volume associated with the push-to-talk call, and the method further comprises:
providing audio feedback associated with the push-to-talk call.

17. The method of claim 1, where a single user interface is accessed to establish communication with one or more contacts from the list of push-to-talk contacts.

18. The device of claim 7, where the particular quality of service is associated with at least one of:
   a connectivity associated with the push-to-talk call, or
   a voice volume associated with the push-to-talk call, and
   where the one or more processors are to:
      provide audio feedback associated with the push-to-talk call.

19. The method of claim 1, where the visual voice indicator includes a number indicating at least one of:
   a decibel level of a voice associated with the push-to-talk call;
   a voice volume associated with the push-to-talk call; or
   a connectivity associated with the push-to-talk call.

20. The device of claim 6, where the visual voice indicator includes a color indicating at least one of:
   a decibel level of a voice associated with the push-to-talk call;
   a voice volume associated with the push-to-talk call; or
   a connectivity associated with the push-to-talk call.

* * * * *